United States Patent [19]

Furuya et al.

[11] Patent Number: 4,614,665
[45] Date of Patent: Sep. 30, 1986

[54] SOYBEAN PROCESSING

[75] Inventors: Inosuke Furuya; Hideo Yamazaki, both of Shizuoka, Japan

[73] Assignee: Kabushiki Kaisha Okawara Seisakusho, Shizuoka, Japan

[21] Appl. No.: 831,668

[22] Filed: Feb. 19, 1986

Related U.S. Application Data

[63] Continuation of Ser. No. 654,321, Sep. 25, 1984, abandoned.

[30] Foreign Application Priority Data

Sep. 28, 1983 [JP] Japan .................................. 58-181108

[51] Int. Cl.$^4$ .............................................. A23L 1/211
[52] U.S. Cl. ...................................... 426/634; 426/511
[58] Field of Search ................................ 426/634, 511

[56] References Cited

U.S. PATENT DOCUMENTS

| 3,901,978 | 8/1975 | Nelson et al. ................... 426/634 X |
| 4,117,174 | 9/1978 | Tonouchi et al. .................. 426/634 |
| 4,318,933 | 3/1982 | Miller, Jr. ....................... 426/634 X |
| 4,409,256 | 10/1983 | Johnson et al. ................. 426/634 X |
| 4,450,176 | 5/1984 | Stahel .............................. 426/634 X |

FOREIGN PATENT DOCUMENTS 633946  1/1983  Switzerland ........................ 426/634

*Primary Examiner*—Robert Yoncoskie
*Attorney, Agent, or Firm*—Bucknam and Archer

[57] ABSTRACT

A method of processing soybeans is disclosed which comprises heating raw soybeans in the absence of added water with superheated steam under atmospheric pressure, and cooling the resulting beans by exposure to the atmosphere. This method permits removing any offensive smell fully from the beans without impairing the natural flavor or taste of the beans.

3 Claims, 1 Drawing Figure

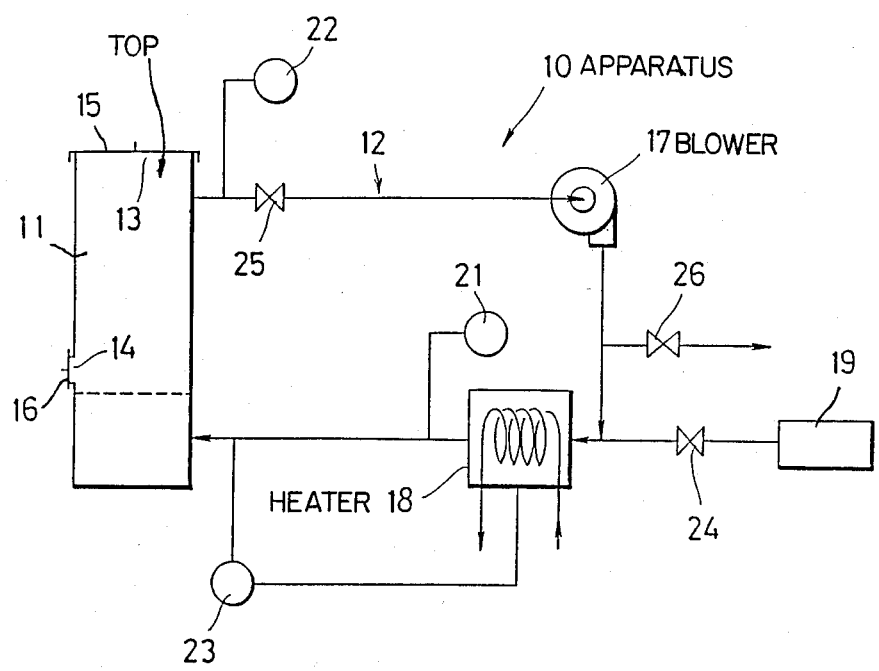

SOYBEAN PROCESSING

This is a continuation of application Ser. No. 654,321, filed Sept. 25, 1984, now abandoned.

BACKGROUND OF THE INVENTION

1. Field of the Invention

This invention relates to a method of processing legumina or soybeans. More specifically, the invention is concerned with a method of deodorizing or eliminating any offensive smell fully from raw soybeans so as to be rendered palatable.

2. Description of the Prior Art

A soybean crop, because of its abundance in proteins, has been widely grown throughout the world for human consumption as a good supply source of vegetable proteins. Principal of these soybean proteins are globulins and albumins, above all, glycinin generally classified as a globulin. The globulins and albumins are composed of essential amino acids such as lysine, leucine, isoleucine, arginine, histidine, phenylalanine, tryptophan, valine and the like, as well as about ten nonessential amino acids. These essential amino acids are so balanced in the soybean proteins as to be suitable for human nutrition.

It has been found that the soybean proteins contain 4 to 17 times as much essential amino acids as wheat proteins. Lysine is one of the amino acids that is extremely deficient in the wheat proteins. The soybean proteins have 16.6 times as much lysine as the wheat proteins. Furthermore, the soybean proteins have 8.1 times as much leucine and isoleucine, 7.1 times as much arginine, 5.3 times as much histidine, 8.5 times as much phenylalanine, 4.5 times tryptophan, and 12.9 times as much valine. Soybeans are therefore valuable as a supplement to wheat flour.

It has recently been accepted that the soybean proteins are even more nutritious than animal proteins. This has lent a great upsurge of soybeans being processable as food directly into the form of particulate, milky and paste products.

However, a disagreeable grassy-smell is peculiar to soybeans in the raw or green stage which cannot be used as such for edible purposes. This smell is known to be attributable to a protein enzyme or lipoxidase derived from some aldehydes and alcohols present in the beans. Several processes have heretofore been proposed to remove such a smell from the soybeans. One typical process involves treating green soybeans with certain alkaline chemicals, saturated steam or hot air. This known method has a drawback that the resulting beans do not smell unpleasant, but tend to be adversely affected even in their meat texture. For example, these bean meats when processed give milk products with large amounts of insoluble matter and in low yields.

Although water boiling may volatilize and remove from green soybeans any substances which would induce an unpleasant smell, the beans become substantially extracted with water. The boiled beans if dried give rise to a flavor or taste different totally from that of the green beans and can only be processed into limited foods such as bean paste (miso), bean curds (tofu), steamed and fermented beans (natto) and similar foods. These foods are usually inherent to the Orient.

Accordingly, no dietary varieties of soybean products are obtainable with the prior art processes.

SUMMARY OF THE INVENTION

It is one object of the invention to provide a method of processing soybeans which is operable with utmost convenience, efficiency and reliability but without the disadvantages of the prior art processes.

Another object of the invention is to provide such a method which assures deodorizing or eliminating any offensive smell fully from raw soybeans while maintaining a desired solubility coefficient of nitrogen, or nitrogen solubility index (NSI), and without impairing the natural flavor or taste of the beans.

According to this invention, there is provided a method of processing soybeans which comprises the steps of heating raw or green soybeans with a heating medium at elevated temperature under atmospheric pressure, and cooling the resulting beans by exposure to the atmosphere.

These and other objects, advantages and features of the invention will become better understood by reference to the following detailed description when considered in connection with the accompanying drawing.

BRIEF DESCRIPTION OF THE DRAWING

The single sheet of drawing illustrates diagrammatically and by way of example a preferred embodiment of this invention and is a schematic side view of apparatus for processing raw soybeans.

DETAILED DESCRIPTION

Referring to the drawing, there is shown apparatus, indicated generally at 10, as adapted to carry a method of this invention into practice. The apparatus 10 includes a vertically disposed tank 11 for heating raw or green soybeans, and a circuit 12 for controlling the circulation of a heating medium or superheated steam into and out of the tank 11, for example, in a clockwise circulation when viewed in cross section in the drawing.

The tank 11 is fabricated of a pressure-resistant material and has a top open portion 13 which serves as an inlet for charging green soybeans thereinto. The tank 11 is also provided on a lower side wall thereof with an outlet 14 for bringing out heat treated beans therefrom. Cover members 15 and 16 are mounted to open and close the inlet 13 and the outlet 14, respectively.

The circuit 12 has a blower 17 and a heater 18 connected for cooperative relation with each other. Arranged external to the circuit 12 is a boiler 19 from which live steam is transferred by an adjusting valve 24 to the heater 18. The live steam is superheated to a given level in the heater 18 and then allowed to flow into the tank 11 at a lower side portion thereof. Also connected to the circuit 12 are first and second thermographs 21 and 22. The first thermograph 21 is positioned between the tank 11 and the heater 18 and adjacent to the latter and adapted to record the temperatures of superheated steam coming from the heater 18. The second thermograph 22, which is disposed adjacent to and upwardly of the tank 11, records the temperatures of steam discharging from the tank 11. Designated at 23 is a temperature regulator arranged to regulate the temperatures of live steam to be superheated in the heater 18. The circuit 12 is so constructed that superheated steam of a predetermined temperature may be forcibly circulated in the tank 11, thereby heat treating the green beans that have been put therein. Upon completion of the heat treatment, superheated steam is caused to discharge out of the tank 11 by means of another adjusting valve 25 and to return via the blower 17 to the heater 18 where the steam is again heated to a given level for recirculation into the tank 11. Drains are wasted by a drain valve 26.

Alternatively, superheated steam may be fed into the tank 11 at an upper side portion thereof, i.e. in a counter-clockwise circulation, with slight modifications made to the circuit 12 and its associated parts.

For the practice of the method according to the invention, green soybeans are first charged into the tank 11. The beans may be in solid form or broken, for example, into six or eight pieces. Live steam is supplied from the boiler 19 to the heater 18 in which the steam is superheated to a given level. Thereafter, superheated steam is caused to feed into and circulate in the tank 11 to thereby heat treat the beans. Upon completion of the heat treatment, the beans are taken out of the tank 11 and cooled by exposure to the atmosphere.

Heating is performed with use of superheated steam as the heating medium under atmospheric pressure. Preferred temperatures of the medium are in the range of about 120° to 200° C. Preferred periods of heating time are in the range of about 10 to 180 seconds. More particularly, it is desired that heating be effected at 120° C. for 180 seconds, at 170° C. for 60 seconds, and at 200° C. for 10 seconds, respectively. Preferred cooling temperatures are smaller than 100° C.

The following specific example is provided to further illustrate the invention.

Green soybeans (weight: 2 kg) with a water content of 12% were each broken into eight pieces and put into the tank 11 (capacity: 4 liters) through the inlet 13. The tank 11 was air-tighted by closing the inlet 13 with the cover 15. The beans were heated with superheated steam of 170° C. being fed into the tank for 45 seconds at a speed of 1,500 liters per minute. After being heat treated, the beans were taken out of the tank and cooled to 40° C. for 90 seconds by contact with atmospheric air.

The beans thus obtained were qualitatively tested and adjudged with the results enumerated below.

(1) The beans are free of aldehydes and alcohols of which a grassy-smell is constituted. Lipoxidase, which emits this smell, can thus be deactivated sufficiently.

(2) The beans are 80% or greater in the solubility coefficient of nitrogen, or nitrogen solubility index (NSI), and hence are substantially as good as green soybeans having such a coefficient of 90%. Moreover, the numerical value of 80% is high by 20 to 30% as compared to the cases with the previously known processes.

(3) The beans have a digestibility of 95% or greater with the least loss of nutritive elements such for example as lysine, vitamin E and like elements.

As has been confirmed from the foregoing results, the method of the invention can prepare soybeans which are readily processable directly into a wide variety of particulate, milky and paste dietary products without the need for heat treatment.

While there has been shown and described what is considered to be a preferred embodiment of this invention, it will be apparent to those versed in the art that various changes and modifications may be made thereto without departing from the spirit or scope of the invention as set out in the appended claims.

What is claimed is:

1. A method of processing soybeans in the absence of added water, consisting of breaking raw or green soybeans into pieces, heating said broken raw or green soybeans with superheated steam at a temperature of 120°–200° C. and at atmospheric pressure for a time effective to avoid development of grassy odor while maintaining a satisfactory nitrogen solubility index, and cooling the resulting beans by exposure to the air whereby the beans are free of grassy odor and have at least 80% Nitrogen Solubility Index.

2. The method according to claim 1, wherein said heating step is effected at a temperature of 120°–200° C. for 10 to 180 seconds, and said cooling step is effected at a temperature lower than 100° C.

3. The method according to claim 2, wherein said heating step is performed at anyone of 120° C. for 180 seconds, at 170° C. for 60 seconds, or at 200° C. for 10 seconds.

* * * * *